US012630213B2

(12) United States Patent
Wu et al.

(10) Patent No.: US 12,630,213 B2
(45) Date of Patent: May 19, 2026

(54) REDUNDANT ELECTRIC POWER STEERING APPARATUS

(71) Applicant: BEIJING JINGWEI HIRAIN TECHNOLOGIES CO., INC., Beijing (CN)

(72) Inventors: Liyuan Wu, Beijing (CN); Xia Yang, Beijing (CN)

(73) Assignee: BEIJING JINGWEI HIRAIN TECHNOLOGIES CO., INC., Beijing (CN)

( * ) Notice: Subject to any disclaimer, the term of this patent is extended or adjusted under 35 U.S.C. 154(b) by 529 days.

(21) Appl. No.: 18/034,524

(22) PCT Filed: Oct. 25, 2022

(86) PCT No.: PCT/CN2022/127232
§ 371 (c)(1),
(2) Date: Apr. 28, 2023

(87) PCT Pub. No.: WO2023/072025
PCT Pub. Date: May 4, 2023

(65) Prior Publication Data
US 2024/0343295 A1 Oct. 17, 2024

(30) Foreign Application Priority Data

Oct. 25, 2021 (CN) .......................... 202111238505.8

(51) Int. Cl.
*B62D 5/04* (2006.01)
*H02K 5/20* (2006.01)
(Continued)

(52) U.S. Cl.
CPC ........... *B62D 5/0406* (2013.01); *B62D 5/046* (2013.01); *H02K 5/207* (2021.01); *H02K 5/225* (2013.01);
(Continued)

(58) Field of Classification Search
CPC ...... B62D 5/0406; B62D 5/046; H02K 11/33; H02K 5/207; H02K 5/225
(Continued)

(56) References Cited

U.S. PATENT DOCUMENTS

2010/0319976 A1 12/2010 Nakai et al.
2017/0291635 A1 10/2017 Yamasaki
(Continued)

FOREIGN PATENT DOCUMENTS

CN 2855009 Y 1/2007
CN 105191080 A * 12/2015 ............. H02K 11/33
(Continued)

OTHER PUBLICATIONS

Chinese Office Action dated Sep. 4, 2024 issued in Chinese Application No. 202111238505.8.
(Continued)

*Primary Examiner* — Jacob D Knutson
(74) *Attorney, Agent, or Firm* — Haverstock & Owens, A Law Corporation

(57) ABSTRACT

An embodiment of the present application provides a redundant electric power steering apparatus including: a first circuit board and a second circuit board configured to control the motor; where the first circuit board and the second circuit board are stacked along a direction parallel to the end face of the casing of the motor; the first circuit board is provided with a plurality of control units; the second circuit board includes a plurality of redundant parts; the plurality of redundant parts are on the same plane; each redundant part is respectively connected to the first circuit board in a bending manner.

14 Claims, 8 Drawing Sheets

(51) Int. Cl.
   *H02K 5/22* (2006.01)
   *H02K 11/33* (2016.01)
(52) U.S. Cl.
   CPC ......... *H02K 11/33* (2016.01); *H02K 2213/06* (2013.01)
(58) Field of Classification Search
   USPC ................................................. 180/444, 446
   See application file for complete search history.

(56) References Cited

U.S. PATENT DOCUMENTS

| | | | | |
|---|---|---|---|---|
| 2019/0150269 A1* | 5/2019 | Klenk | .................. | B62D 5/0403 310/68 R |
| 2019/0199175 A1 | 6/2019 | Kanazawa et al. | | |
| 2020/0287440 A1 | 9/2020 | Kanazawa et al. | | |
| 2021/0075301 A1 | 3/2021 | Ichikawa et al. | | |

FOREIGN PATENT DOCUMENTS

| | | | | | |
|---|---|---|---|---|---|
| CN | 109768670 | A | | 5/2019 | |
| CN | 109788641 | A | | 5/2019 | |
| CN | 111264021 | A | | 6/2020 | |
| CN | 213502561 | U | | 6/2021 | |
| CN | 113544949 | A | | 10/2021 | |
| CN | 113771940 | A | * | 12/2021 | .......... B62D 5/0406 |
| CN | 113844532 | A | | 12/2021 | |
| CN | 216185445 | U | | 4/2022 | |
| DE | 102016221347 | A1 | * | 5/2018 | ............... H02K 3/28 |
| DE | 102021114069 | A1 | * | 12/2021 | ............... B62D 5/04 |
| FR | 2917476 | A1 | * | 12/2008 | .......... F16C 41/007 |
| JP | 2009189187 | A | | 8/2009 | |
| JP | 2019088162 | A | | 6/2019 | |
| JP | 2020108237 | A | * | 7/2020 | |
| WO | 2020153635 | A1 | | 7/2020 | |

OTHER PUBLICATIONS

Extended European Search Report dated Sep. 16, 2024 issued in European Patent Application No. EP22885902.1.
European Office Action dated May 2, 2025, from European Patent Application No. 22885902.1.
International Search Report issued on Jan. 20, 2023 for PCT Application No. PCT/CN2022/127232.

* cited by examiner

REDUNDANT ELECTRIC POWER STEERING APPARATUS

CROSS-REFERENCE TO RELATED APPLICATIONS

This application is a National Stage of International Application No. PCT/CN2022/127232 filed on Oct. 25, 2022, which claims priority to Chinese Patent Application No. 202111238505.8, filed on Oct. 25, 2021, entitled "REDUNDANT ELECTRIC POWER STEERING APPARATUS", both of which are hereby incorporated by reference in their entireties.

TECHNICAL FIELD

The present application relates to the field of control, and in particular to a redundant electric power steering apparatus.

BACKGROUND

On the basis of a conventional mechanical steering mechanism, an electric power steering (EPS) system has additional signal sensing apparatus, electronic control apparatus and power steering mechanism. The electric power steering system uses the power generated by a motor to assist a driver in steering. When no steering operation is performed, the motor does not work. In a steering operation, a steering wheel torque and a rotation direction signal detected by a torque sensor are transmitted to a control unit. The control unit sends an instruction to the motor according to the magnitude of the torque and the direction thereof and the vehicle speed signal transmitted from the vehicle speed sensor, and the motor outputs a torque of the corresponding magnitude and direction to generate the assisting power.

SUMMARY

The present application provides a redundant electric power steering apparatus, in order to overcome at least one technical problem existing in the background technology.

According to an embodiment of the present application, a redundant electric power steering apparatus is provided. The redundant electric power steering apparatus includes a first circuit board and a second circuit board configured to control a motor, and the first circuit board and the second circuit board are stacked along a direction parallel to an end face of a casing of the motor, the second circuit board includes a plurality of redundant parts, the plurality of redundant parts are positioned on a same plane, and each of the redundant parts is respectively connected to the first circuit board in a bending manner.

Optionally, the redundant parts are equal in number to the control units, and the redundant parts are in one-to-one correspondence with the control units, so that each of the control units is respectively connected to a set of power devices to form multiple sets of processor modules.

Further optionally, the number of the redundant parts is two, the two redundant parts are centrosymmetric with respect to an axial direction of a drive shaft of the motor.

Further optionally, each of the first circuit board and the second circuit board is circular, the second circuit board is divided into two equal semicircles to form the two redundant parts, and all devices arranged on the two redundant parts are centrosymmetric with respect to an axial direction of a drive shaft of the motor.

Further optionally, the two redundant parts are respectively connected to the first circuit board through a bent flexible circuit board to implement bilateral redundancy.

Further optionally, the redundant electric power steering apparatus further includes connectors, each of the two redundant parts is connected to one set of connectors, and the two sets of connectors are centrosymmetric with respect to the axial direction of the drive shaft of the motor, and each of the two sets of connectors includes a first connector and a second connector.

Further optionally, pins of the two sets of connectors are respectively soldered to the two redundant parts centrosymmetrically with respect to the drive shaft of the motor, soldering locations for the pins of each of the two sets of connectors are arranged linearly and are distributed in parallel along a boundary line separating the two redundant parts. Optionally, the motor is a six-phase brushless motor, pins of the motor are divided into two sets of pins with equal pin numbers, the two sets of pins of the motor are respectively soldered at locations of the two redundant parts away from a circle center of the second circuit board, and the pins of each of the two sets of pins of the motor are equally spaced and uniformly distributed.

Further optionally, the redundant electric power steering apparatus further includes a base and a housing, bosses are arranged on both of upper and lower surfaces of the base, the second circuit board and the first circuit board are respectively mounted on the upper and lower surfaces of the base, and are adhered to the bosses via heat conductive adhesive, the base, the first circuit board and the second circuit board are accommodated in the housing, the connectors are soldered to the second circuit board, and interfaces of the connectors are connected to space outside the housing.

Further optionally, the bosses are correspondingly designed according to MOS tubes and an exposed copper area at pre-drive position on the second circuit board and MOS tubes and an exposed copper area at pre-drive position on the first circuit board, so that the bosses are connected to an area of the second circuit board that needs to be dissipated and an area of the first circuit board that needs to be dissipated, and are adhered to the second circuit board and the first circuit board by the heat conductive adhesive for heat dissipation.

Further optionally, the housing is provided with an air-permeable channel, one end of the air-permeable channel is opened on an outer side surface of the housing, the other end of the air-permeable channel is opened on an inner upper surface of the housing, and the end of the air-permeable channel opened on the inner upper surface of the housing is provided with a waterproof air-permeable membrane.

Further optionally, the base is mounted to an end face of the casing of the motor on a side opposite to an output portion of the drive shaft of the motor, and the housing is snap-fitted to an end of the casing of the motor on the side opposite to the output portion of the drive shaft of the motor to form a sealed space with the casing of the motor, a plurality of mounting lugs extending downward are arranged on a side surface of the base, the mounting lugs are provided with mounting holes, mounting portions corresponding to the mounting lugs are arranged on the end face of the casing of the motor on the side opposite to the output portion of the drive shaft of the motor, and the mounting lugs are mounted to the mounting portions with screws passing through the mounting holes, the housing is provided with wrapping portions corresponding to the mounting lugs, and when the housing is snap-fitted to the casing of the motor, the wrapping portions are snap-fitted to the mounting portions so that the mounting lugs are placed in the sealed space between the housing and the casing of the motor.

Further optionally, three clips are uniformly arranged on a side surface of the housing by being spaced apart from one another by 120° along a circumferential direction, the clips are spaced apart from the wrapping portions, and stops corresponding to the clips are arranged on a side surface of the casing of the motor.

Further optionally, each of the clips includes a first vertical portion, a second vertical portion and a connection portion, one end of the first vertical portion and one end of the second vertical portion are respectively fixed on the side surface of the housing, the other end of the first vertical portion and the other end of the second vertical portion are connected via the connection portion, and the clip for clamping the stop is formed by the first vertical portion, the second vertical portion and the connection portion.

Further optionally, both sides of the stop are respectively provided with a stop bar, and when the stop is clamped in the clip, the first vertical portion is clamped between the stop and one of the stop bars, and the second vertical portion is clamped between the stop and the other of the stop bars.

BRIEF DESCRIPTION OF THE DRAWINGS

In order to illustrate technical solutions of embodiments of the present application more clearly, the drawings required for the embodiments of the present application will be briefly described. Obviously, the drawings described below illustrate only some embodiments of the present application. For a person skilled in the art, other drawings can also be obtained from these drawings without any inventive efforts.

Figure 1:
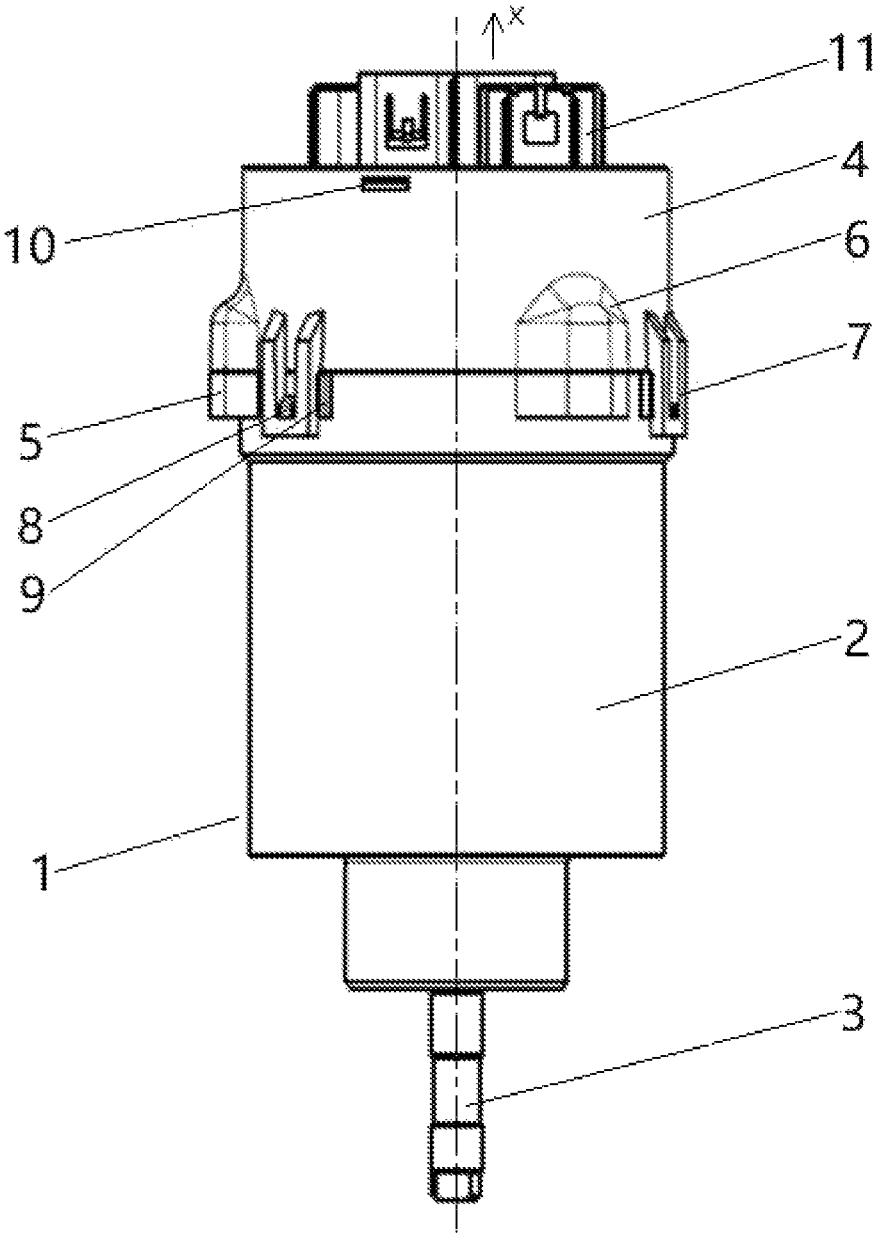
FIG. 1 is a front view of a redundant electric power steering apparatus according to an embodiment of the present application.
Figure 2:
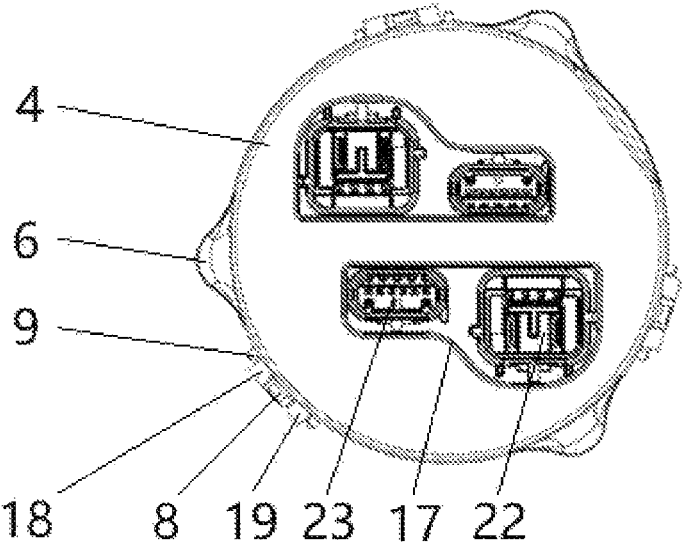
FIG. 2 is a top view of a redundant electric power steering apparatus according to an embodiment of the present application.

Reference numerals: 1 is motor, 2 is casing, 3 is drive shaft, 4 is housing, 5 is mounting portion, 6 is wrapping portion, 7 is clip, 8 is stop, 9 is stop bar, 10 is one end of air-permeable channel, 11 is connector, 12 is screw, 13 is plug end pin of motor pin set, 14 is circuit board, 15 is base, 16 is mounting bolt, 17 is top opening of housing, 18 is first vertical portion, 19 is second vertical portion, 20 is connection portion, 21 is waterproof air-permeable membrane, 22 is first connector, 23 is second connector, 24 is second circuit board, 25 is first circuit board, 26 is flexible connection plate, 27 is slot, 28 is mounting hole, 29 is mounting lug, 30 is base body, 31 is boss, 32 is positioning pin, 33 is threaded hole, 34 is fixing portion.

DETAILED DESCRIPTION

Technical solutions of embodiments of the present application will be described clearly and completely in conjunction with drawings in the embodiments of the present application. Obviously, the described embodiments are merely a part of the embodiments of the present application, but not all of the embodiments. Based on the embodiments in the present application, all other embodiments obtained by those ordinary skilled in the art without any creative work shall fall within the protection scope of the present application.

It is to be noted that the terms "including" and "having," as well as any variations thereof, in the embodiments and drawings of the present application are intended to cover a non-exclusive inclusion. For example, a process, method, system, product, or device that includes a series of steps or units is not limited to the illustrated steps or units, but may optionally include other steps or units not listed or inherent to such processes, methods, products, or devices.

Currently, some systems, including EPS systems, employ packaging technology in which an electronic control unit (ECU) that controls a rotation speed and a rotation torque of a motor is integrated with the motor. Furthermore, with the continuous development of EPS technology, due to the limitation of size and space, the power unit structure in which the motor and the controller are integrated is increasingly favored, and especially for components, such as a dual-pinion type DP-EPS and a rack-assisted R-EPS, in which a steering machine is mounted outside a cockpit, the mounting space is more compact. Therefore, in order to overcome the limitation of installation space in the vehicle, it is necessary to improve arrangement efficiency in the package and reduce the size of the package, improving space utilization.

However, as the safety requirements for the EPS controller increase and the number of vehicle electrical systems increases, increasing redundant electronic control units becomes a major strategy to cope with this. In an existing redundant design, two ECUs monitor each other and operate independently, and hardware (H/W) structures of the two ECUs are almost completely the same. Typically, each of the two ECUs is made into one PCBA plate for integration, which certainly increases the packaging size and the volume of a redundant electric power-driven control apparatus structure, which is disadvantageous to overcome the limitation of the installation space in the vehicle.

Redundant control is an effective means for satisfying continuous production requirements and improving the system availability. With the increase of competition in the manufacturing industry, manufacturers are more pursue for the reliability of production devices, and in particular, for devices for controlling critical production processes, redundant configuration is often needed. At present, most redundant systems based on programmable controllers adopt at least two sets of processor modules, that is, at least two independent control units are designed. In a redundant design in the background technology, two control units are respectively disposed on two mutually independent circuit boards. One circuit board is further added on the basis of one original circuit board. Such dual circuit board configuration will certainly increase the packaging size and the volume of the redundant control apparatus. As a result, the overall volume of the redundant electric power steering apparatus is large, which is disadvantage to overcome the limitation of the installation space in the vehicle.

In this regard, embodiments of the present application provide a redundant electric power steering apparatus, which is an apparatus that assists a driver's steering operation in a transportation apparatus, such as an automobile. The apparatus is highly integrated, of small volume, implements electric power steering control functions within a narrow space.

A redundant electric power steering apparatus provided by an embodiment of the present application includes a first circuit board and a second circuit board configured to control a motor, and the first circuit board and the second circuit board are stacked along a direction parallel to an end face of a casing of the motor, the second circuit board includes a plurality of redundant parts, the plurality of redundant parts are positioned on a same plane, and each of the redundant parts is respectively connected to the first circuit board in a bending manner.

Optionally, the redundant parts are equal in number to the control units, and the redundant parts are in one-to-one correspondence with the control units, so that each of the control units is respectively connected to a set of power devices to form multiple sets of processor modules.

Further optionally, the number of the redundant parts is two, the two redundant parts are centrosymmetric with respect to an axial direction of a drive shaft of the motor.

Further optionally, each of the first circuit board and the second circuit board is circular, the second circuit board is divided into two equal semicircles to form the two redundant parts, and all devices arranged on the two redundant parts are centrosymmetric with respect to an axial direction of a drive shaft of the motor.

Further optionally, the two redundant parts are respectively connected to the first circuit board through a bent flexible circuit board to implement bilateral redundancy.

Further optionally, the redundant electric power steering apparatus further includes connectors, each of the two redundant parts is connected to one set of connectors, and the two sets of connectors are centrosymmetric with respect to the axial direction of the drive shaft of the motor, and each of the two sets of connectors includes a first connector and a second connector. Further optionally, pins of the two sets of connectors are respectively soldered to the two redundant parts centrosymmetrically with respect to the drive shaft of the motor, soldering locations for the pins of each of the two sets of connectors are arranged linearly and are distributed in parallel along a boundary line separating the two redundant parts. Optionally, the motor is a six-phase brushless motor, pins of the motor are divided into two sets of pins with equal pin numbers, the two sets of pins of the motor are respectively soldered at locations of the two redundant parts away from a circle center of the second circuit board, and the pins of each of the two sets of pins of the motor are equally spaced and uniformly distributed.

Further optionally, the redundant electric power steering apparatus further includes a base and a housing, bosses are arranged on both of upper and lower surfaces of the base, the second circuit board and the first circuit board are respectively mounted on the upper and lower surfaces of the base, and are adhered to the bosses via heat conductive adhesive, the base, the first circuit board and the second circuit board are accommodated in the housing, the connectors are soldered to the second circuit board, and interfaces of the connectors are connected to space outside the housing.

Further optionally, the bosses are correspondingly designed according to MOS tubes and an exposed copper area at pre-drive position on the second circuit board and MOS tubes and an exposed copper area at pre-drive position on the first circuit board, so that the bosses are connected to an area of the second circuit board that needs to be dissipated and an area of the first circuit board that needs to be dissipated, and are adhered to the second circuit board and the first circuit board by the heat conductive adhesive for heat dissipation. Further optionally, the housing is provided with an air-permeable channel, one end of the air-permeable channel is opened on an outer side surface of the housing, the other end of the air-permeable channel is opened on an inner upper surface of the housing, and the end of the air-permeable channel opened on the inner upper surface of the housing is provided with a waterproof air-permeable membrane.

Further optionally, the base is mounted to an end face of the casing of the motor on a side opposite to an output portion of the drive shaft of the motor, and the housing is snap-fitted to an end of the casing of the motor on the side opposite to the output portion of the drive shaft of the motor to form a sealed space with the casing of the motor, a plurality of mounting lugs extending downward are arranged on a side surface of the base, the mounting lugs are provided with mounting holes, mounting portions corresponding to the mounting lugs are arranged on the end face of the casing of the motor on the side opposite to the output portion of the drive shaft of the motor, and the mounting lugs are mounted to the mounting portions with screws passing through the mounting holes, the housing is provided with wrapping portions corresponding to the mounting lugs, and when the housing is snap-fitted to the casing of the motor, the wrapping portions are snap-fitted to the mounting portions so that the mounting lugs are placed in the sealed space between the housing and the casing of the motor.

Further optionally, three clips are uniformly arranged on a side surface of the housing by being spaced apart from one another by 120° along a circumferential direction, the clips are spaced apart from the wrapping portions, and stops corresponding to the clips are arranged on a side surface of the casing of the motor.

Further optionally, each of the clips includes a first vertical portion, a second vertical portion and a connection portion, one end of the first vertical portion and one end of the second vertical portion are respectively fixed on the side surface of the housing, the other end of the first vertical portion and the other end of the second vertical portion are connected via the connection portion, and the clip for clamping the stop is formed by the first vertical portion, the second vertical portion and the connection portion.

Further optionally, both sides of the stop are respectively provided with a stop bar, and when the stop is clamped in the clip, the first vertical portion is clamped between the stop and one of the stop bars, and the second vertical portion is clamped between the stop and the other of the stop bars.

The redundant electric power steering apparatus provided by the embodiments of the present application will now be described in detail.

FIG. 1 to FIG. 11 illustrate a redundant electric power steering apparatus provided in accordance with an embodiment of the present application. As shown in FIG. 1 to FIG. 11, the redundant electric power steering apparatus includes: a motor 1, a base 15, a housing 4, a connector 11, and a circuit board 14 configured to control the motor 1. The circuit board 14, the base 15 and the connector 11 are partially accommodated in the housing 4. The connector 11, the circuit board 14 and the base 15 are sequentially connected, and mounted to the motor 1 through the base 15. The motor 1 is electrically connected to the circuit board 14, so that the motor 1 is controlled using the circuit board 14.

Figure 6:
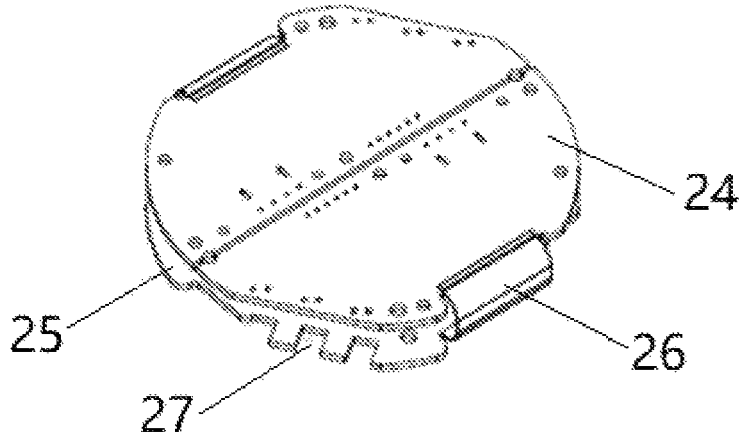
FIG. 6 is a schematic structural diagram of a circuit board of a redundant electric power steering apparatus according to an embodiment of the present application.
Figure 7:
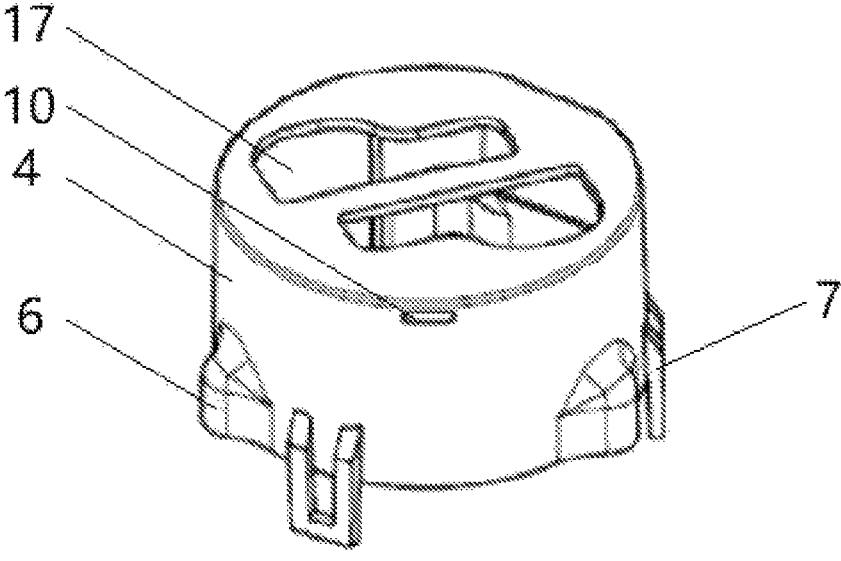
FIG. 7 is a schematic structural diagram of a housing of a redundant electric power steering apparatus according to an embodiment of the present application.
Figure 8:
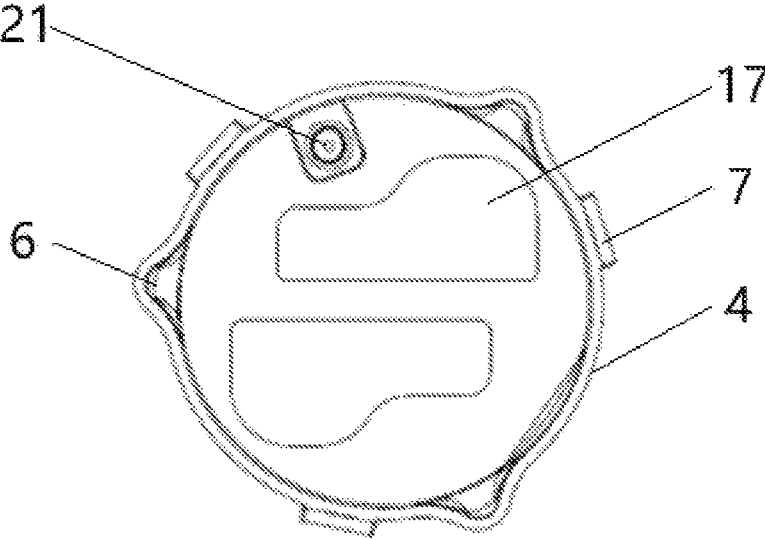
FIG. 8 is a schematic bottom view of a housing of a redundant electric power steering apparatus according to an embodiment of the present application.
Figure 9:
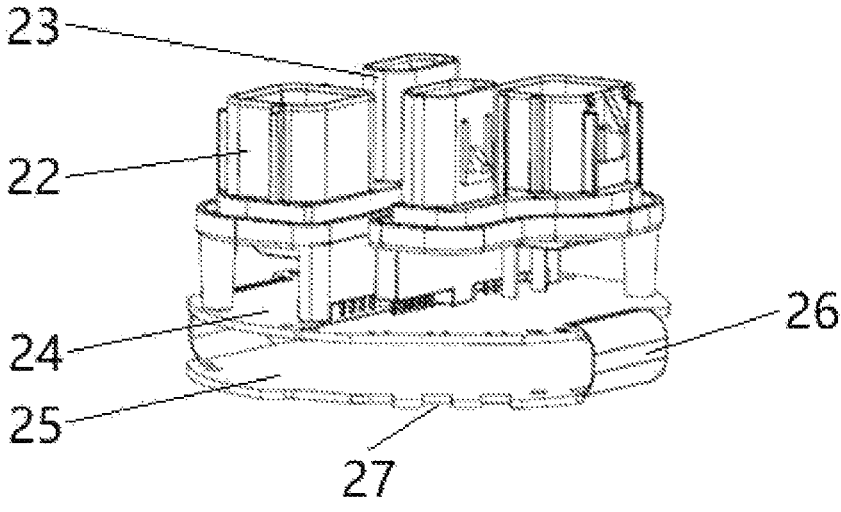
FIG. 9 is a schematic structural diagram of a circuit board and a connector of a redundant electric power steering apparatus according to an embodiment of the present application.

Specifically, the circuit board 14 is a main structure of the redundant electric power steering apparatus. With further reference to FIG. 6, the circuit board 14 includes a first circuit board 25 and a second circuit board 24. The first circuit board 25 and the second circuit board 24 are stacked along a direction parallel to an end face of a casing 2 of the motor 1. That is, the first circuit board 25 and the second circuit board 24 are stacked up and down, and the three planes of the first circuit board 25, the second circuit board 24, and the end face of the casing 2 of the motor 1 are parallel to one another. Thus, a radial space is efficiently utilized, and a maximum effective use area as possible in a minimum space along an axial direction of a drive shaft 3 of the motor 1 is utilized, which reduces the occupation of the axial space, so as to reduce the spaced occupied by the circuit board with respect to the whole apparatus as much as possible.

In order to realize redundant control, a plurality of control units (not shown in the drawings) are arranged on the first circuit board 25, and correspondingly, the second circuit board 24 includes a plurality of redundant parts. The redundant parts are equal in number to the control units, and the redundant parts are in one-to-one correspondence with the control units, so that each control unit is respectively connected to a set of power devices, thereby forming multiple sets of processor modules, and realizing multilateral redundant and independent control. In the embodiments of the present application, a set of power devices includes, but is not limited to, devices such as a connector, an MOS tube, a capacitive and an inductor. A set of processor modules includes, but is not limited to, devices such as a control device, a connector, an MOS tube, a capacitor and an inductor. The circuit board 14 can be a printed circuit board (PCB). The control unit is also referred to as a control device or a controller.

The plurality of redundant parts in the second circuit board 24 are positioned on a same plane. Each redundant part is respectively connected to the first circuit board 25 in a bending manner. That is, a semi-flexible printed circuit board (Semi-Flex PCB) is used between the first circuit board 25 and the redundant parts of the second circuit board 24 to realize bending parallel, and thereby a bilateral redundancy is formed and can be independently controlled, which efficiently utilizes a radial space, reduces the occupation of the axial space, and greatly reduces the overall volume of the apparatus. In a specific embodiment, the number of the redundant parts is two. The two redundant parts are respectively connected to the first circuit board 25 via one flexible connection plate 26 in a bending manner, to form a bilateral folded circuit board structure. The flexible connection plate 26 is a flexible circuit board provided with circuit board wiring, so that the first circuit board 25 and the devices on the redundant parts are interconnected via the circuit board wiring. The second circuit board 24 is of a two-part centrosymmetric design. The two redundant parts are centrosymmetric with respect to the axial direction of the drive shaft of the motor 1. The axial direction of the drive shaft of the motor 1 is the X direction in FIG. 1. In order to further reduce the overall volume of the redundant electric power steering apparatus, the shapes of the first circuit board 25 and the second circuit board 24 are designed as circles corresponding to the shape of the end face of the casing 2 of the motor 1, the second circuit board 24 is divided into two equal semi-circles to form two redundant parts centrosymmetric with each other, and all the devices arranged on the two redundant parts are designed as being centrosymmetric with respect to the axial direction of the drive shaft of the motor 1, where the axial direction of the drive shaft of the motor 1 is the X direction in FIG. 1. With such design, the structure with the two sets of processor modules which are completely the same can be centrosymmetric. As a result, the structural arrangement is made more uniform and compact, and the arrangement space of the circuit board is greatly saved.

The connector 11 is a device that connects two active devices for transmitting current or signal. In an embodiment of the present application, for effective error prevention of plugging and unplugging at wiring harness end, under the condition of realizing redundant power supply and signal input and output, the connectors 11 are designed as two separate sets of connectors. Each set of connectors 11 includes: power connectors, signal connectors and TAS connectors depending on function. Each of the two redundant parts is connected to one set of connectors 11. Each set of connectors 11 are interfaces enabling corresponding control units to be connected to an external power source and an external apparatus. The sets of connectors 11 are independent from each other. In a specific embodiment, a suitable connector male port interface is selected. Each set of connectors 11 includes a first connector 22 and a second connector 23. A power pin and a signal pin are integrated in one male port interface (that is, the first connector 22), and a plurality of pins of the TAS is another male port interface (that is, the second connector 23), so as to reduce the occupied space by the connectors 11 as possible under the condition of satisfying functions. At the same time, the two sets of connectors 11 are also centrosymmetrically with respect to the axial direction of the drive shaft of the motor 1, ensuring that the same structures of the two sets of processor modules are all centrosymmetrically, so that the arrangement is more uniform and compact, and the space occupied by the connectors 11 is smaller.

In another specific embodiment, the pins of the two sets of connectors 11 are respectively centrosymmetrically soldered to the two redundant parts. At the same time, in order to allow more space for arranging other electronic elements on the circuit board 14, as shown in FIG. 6, the soldering locations for the pins of each set of connectors are linearly arranged and distributed in parallel along a boundary line separating the two redundant parts, so that there is more remaining space for arranging other electronic elements on the second circuit board, thereby ensuring that the occupied space of the first circuit board is small and the two semi-circular redundant parts can be arranged with two sets of processor modules.

Figure 3:
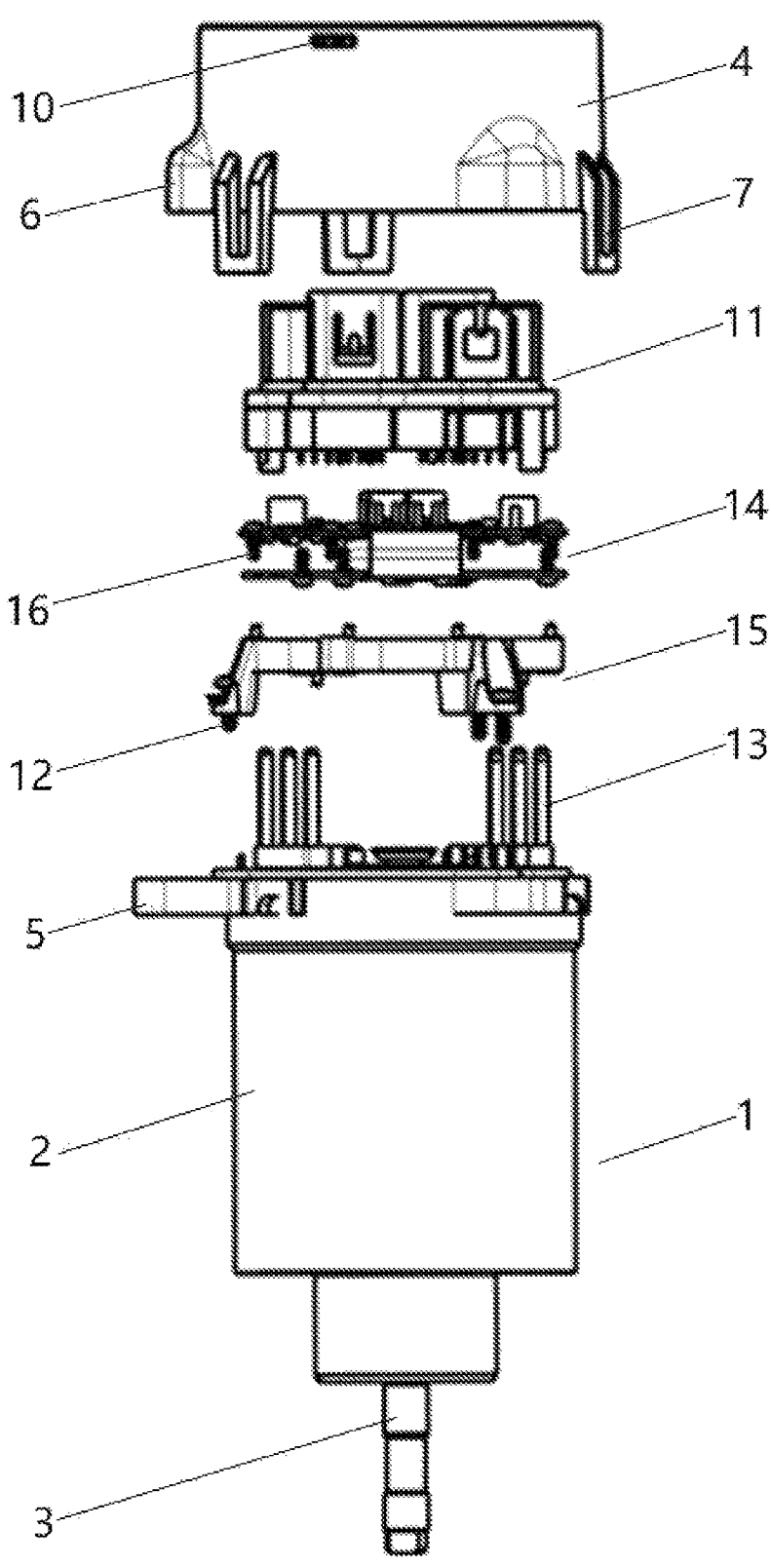
FIG. 3 is a schematic partial structural exploded diagram of a redundant electric power steering apparatus according to an embodiment of the present application.
Figure 10:
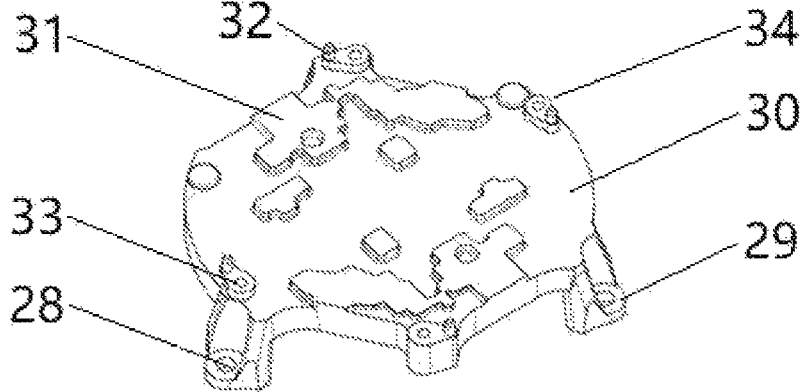
FIG. 10 is a schematic structural diagram of a base of a redundant electric power steering apparatus according to an embodiment of the present application.
Figure 11:
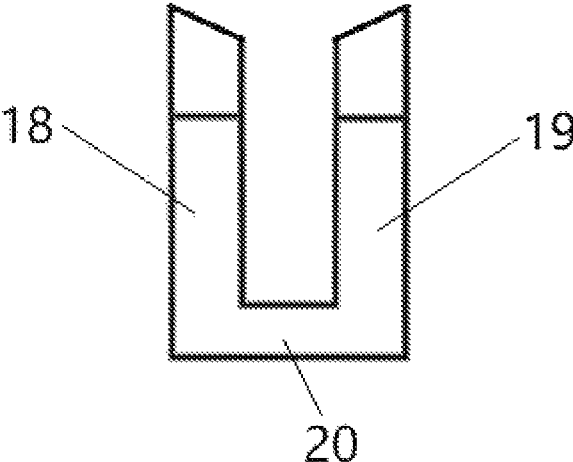
FIG. 11 is a schematic structural diagram of a clip of a redundant electric power steering apparatus according to an embodiment of the present application.

The base 15 is mainly for mounting the circuit board 14 to the motor 1, and functions for fixing and supporting the circuit board 14. Since the circuit board 14 in the embodiments of the present application adopts a structure of bilateral folded upper and lower circuit boards, in order to ensure the fixing and supporting function for the first circuit board 25 and the second circuit board 24 at the same time, the second circuit board 24 and the first circuit board 25 are respectively mounted to the upper and lower surfaces of the base 15, and the flexible connection plate 26 is arranged on the side surface of the base 15 for connecting the redundant parts of the first circuit board 25 and the second circuit board 24 respectively. In a specific embodiment, as shown in FIG. 3 and FIG. 10, the base 15 includes a base body 30 and a fixing portion 34. A plurality of fixing portions 34 for mounting and fixing the circuit board 14 are arranged on both the upper and lower surfaces of the base body 30. The fixing portion 34 is provided with a threaded hole 33. The second circuit board and the first circuit board are respectively mounted to the upper and lower surfaces of the base 15 with the mounting bolt 16 passing through the threaded hole 33 of the fixing portion 34. In a specific implementation, first, the first circuit board is mounted to the lower surface of the base 15 with the mounting bolt 16 passing through the threaded hole 33 on the lower surface of the base body 30, the plurality of redundant parts are folded onto the upper surface of the base body 30 through the flexible connection plate, and then the plurality of second circuit boards are respectively fixedly mounted to the upper surface of the base 15 with the mounting bolt 16 passing through the threaded hole 33 on the upper surface of the base body 30, thereby completing the mounting of the circuit board 14 to the base 15, which is simple in operation and stable in connection. Further, since the heating power consumption of the high-power device connected on the circuit board 14 is large, in order to ensure the stable and reliable operation of the redundant control apparatus, a heat dissipation design for the high-power device is required. In an embodiment of the present application, bosses 31 are arranged on both the upper and lower surfaces of the base 15, that is, the bosses 31 are arranged on both the upper and lower surfaces of the base body 30. The first circuit board and the second circuit board are adhered to the bosses 31 via a heat conductive adhesive. The bosses 31 on the upper and lower surfaces of the base body 30 are correspondingly designed according to MOS tubes and an exposed copper area at pre-drive position on the second circuit board and MOS tubes and an exposed copper area at pre-drive position on the first circuit board respectively, so that the bosses 31 are connected to an area of the second circuit board that needs to be dissipated and an area of the first circuit board that needs to be dissipated, and are adhered to the second circuit board and the first circuit board by the heat conductive adhesive for heat dissipation, so as to ensure the stable operation of the high-power device. With such design, arrangement of a separate heat dissipation apparatus in the redundant electric power steering apparatus is omitted, and the overall volume of the redundant electric power steering apparatus is reduced. In a specific implementation, the height of the boss 31 is less than the height of the fixing portion 34, so that when the first circuit board and the second circuit board are mounted to the base 15, there is a certain gap between the boss 31 and the first circuit board, and a certain gap between the boss 31 and the second circuit board, providing a space for the arrangement of the heat conductive adhesive.

In order to enable the circuit board 14 to be quickly and accurately mounted to the base 15, in an embodiment of the present application, the fixing portion 34 is further provided with a positioning pin 32, and the first circuit board and the second circuit board are respectively provided with positioning holes (not shown in the drawings) corresponding to the positioning pins 32, so that the positioning holes of the first circuit board and the second circuit board are inserted with the positioning pins 32, and the circuit board 14 can be accurately and quickly positioned on the base 15, thereby achieving quick mounting.

The base 15 is mounted to the end face of the casing 2 of the motor 1 on the side opposite to the output portion of the drive shaft 3 of the motor 1, so as to fixedly connect the circuit board 14 and the connector 11 of the redundant electric power steering apparatus to the end face of the casing 2. The housing 4 is snap-fitted to one end of the casing 2 of the motor 1 on the side opposite to the output portion of the drive shaft 3 of the motor 1, and a sealed space is formed between the housing 4 and the casing 2 of the motor 1. The base 15, the circuit board 14 and the connector 11 are partially accommodated in the sealed space, so that a protection function is achieved.

Further, in a specific embodiment, the circuit board 14 is fixed to the base 15 via a plurality of mounting bolts 16, and the base 15 and the circuit board 14 are mounted to the motor 1 via a screw 12, so that electric current can be delivered to the base 15 via the mounting bolt 16 and then to the motor 1 via the screw 12, and the purpose of grounding is achieved. That is, the base 15 not only serves to fix and support the circuit board 14 and connect the motor 1, but also serves the function of grounding conduction. In an embodiment of the present application, the base 15 has the functions of fixing, connecting, heat dispassion and grounding. Multiple functions are integrated into the base 15. Most structures are saved, assembly parts are saved, and the overall volume of the redundant electric power steering apparatus is reduced.

In another specific embodiment, in order to reduce the overall volume of the redundant electric power steering apparatus as possible and ensure the stability of the connection between the base 15 and the motor 1, a plurality of mounting portions 5 are arranged on the end face of the casing 2 of the motor 1 on the side opposite to the output portion of the drive shaft 3 of the motor 1, and accordingly, a plurality of mounting lugs 29 extending downwards are arranged on the side surface of the base 15. The mounting lugs 29 are corresponding to the mounting portions 5 of the motor 1, and the mounting lugs 29 are provided with mounting holes 28. The mounting lugs 29 are mounted to the mounting portions 5 with the screw 12 passing through the mounting holes 28, and thus, the base 15 and the circuit board 14 and the connector 11 thereon are fixed to the end face of the casing 2. Further, the housing 4 is provided with wrapping portions 6 corresponding to the mounting lugs 29. When the housing 4 is snap-fitted to the casing 2 of the motor 1, the wrapping portion 6 is snap-fitted to the mounting portion 5, so that the mounting lug 29 is placed in the sealed space between the housing 4 and the casing 2 of the motor 1. Therefore, the base 15 and the circuit board 14 and the connector 11 thereon are partially wrapped in the housing 4, and at the same time, the screw 12 for connection is also wrapped in the housing 4. Since the redundant electric power steering apparatus is mounted to the chassis, of which the salt fog test requirement is high. The wrapping portion 6 of the housing 4 directly wrapping entire screw 12 avoids certain screw having difficulty meeting the design requirements of the salt fog test.

In an embodiment of the present application, the housing 4, as a protection structure, is snap-fitted to the casing 2 of the motor 1. The base 15, the first circuit board 25 and the second circuit board 24 are accommodated in the housing 4. The connector 11 is soldered to the second circuit board 24, a part of the connector 11 is accommodated in the housing 4, and the interface of the connector 11 is connected to the space outside the housing 4. Therefore, the base 15, the first circuit board 25, the second circuit board 24 and the connector 11 are protected. In a specific embodiment, three clips 7 are uniformly arranged on a side surface of the housing 4 by being spaced apart from one another by 120° along a circumferential direction. Accordingly, stops 8 corresponding to the clips 7 are arranged on a side surface of the casing 2 of the motor 1. The housing 4 is snap-fitted to the casing 2 with the stop 8 being clamped in the clip 7. Since the housing 4 and the casing 2 are sealed by means of gluing, the casing 2 is snap-fitted with the housing 4 after the gluing. When the adhesive between the housing 4 and the casing 2 is not dried, the clip 7 fixes the housing 4 to the casing 2, which is advantageous for uniformly drying the adhesive and more advantageous for achieving the connection between the housing 4 and the casing 2 and ensuring the sealing. In detail, referring again to FIG. 11, the clip 7 includes a first vertical portion 18, a second vertical portion 19 and a connection portion 20. One end of the first vertical portion 18 and one end of the second vertical portion 19 are respectively fixed to a side surface of the housing 4. The other end of the first vertical portion 18 and the other end of the second vertical portion 19 are connected via the connection portion 20. The clip 7 for clamping the stop 8 is formed by the first vertical portion 18, the second vertical portion 19 and the connection portion 20. In addition, two stop bars 9 are arranged on both sides of the stop 8 respectively. When the stop 8 is clamped in the clip 7, the first vertical portion 18 is clamped between the stop 8 and one of the stop bars 9, and the second vertical portion 19 is clamped between the stop 8 and the other stop bar 9. First, it facilitates the quick and accurate positioning for the connection between the housing 4 and the casing 2, and second, the stability of the connection between the housing 4 and the casing 2 is further strengthened. In order to avoid interference between structures in the redundant electric power steering apparatus, the clip 7 and the wrapping portion 6 are spaced apart. In a specific implementation process, the numbers of the wrapping portions 6, the clips 7, the mounting portions 5 and the stops 8 are all provided as three, and each of the three of those are uniformly distributed by being spaced apart from one another by 120° along a circumferential direction. The three wrapping portions 6 and the three clips 7 are arranged at intervals, and accordingly, the three mounting portions 5 and the three stops 8 are also arranged at intervals.

Figure 4:
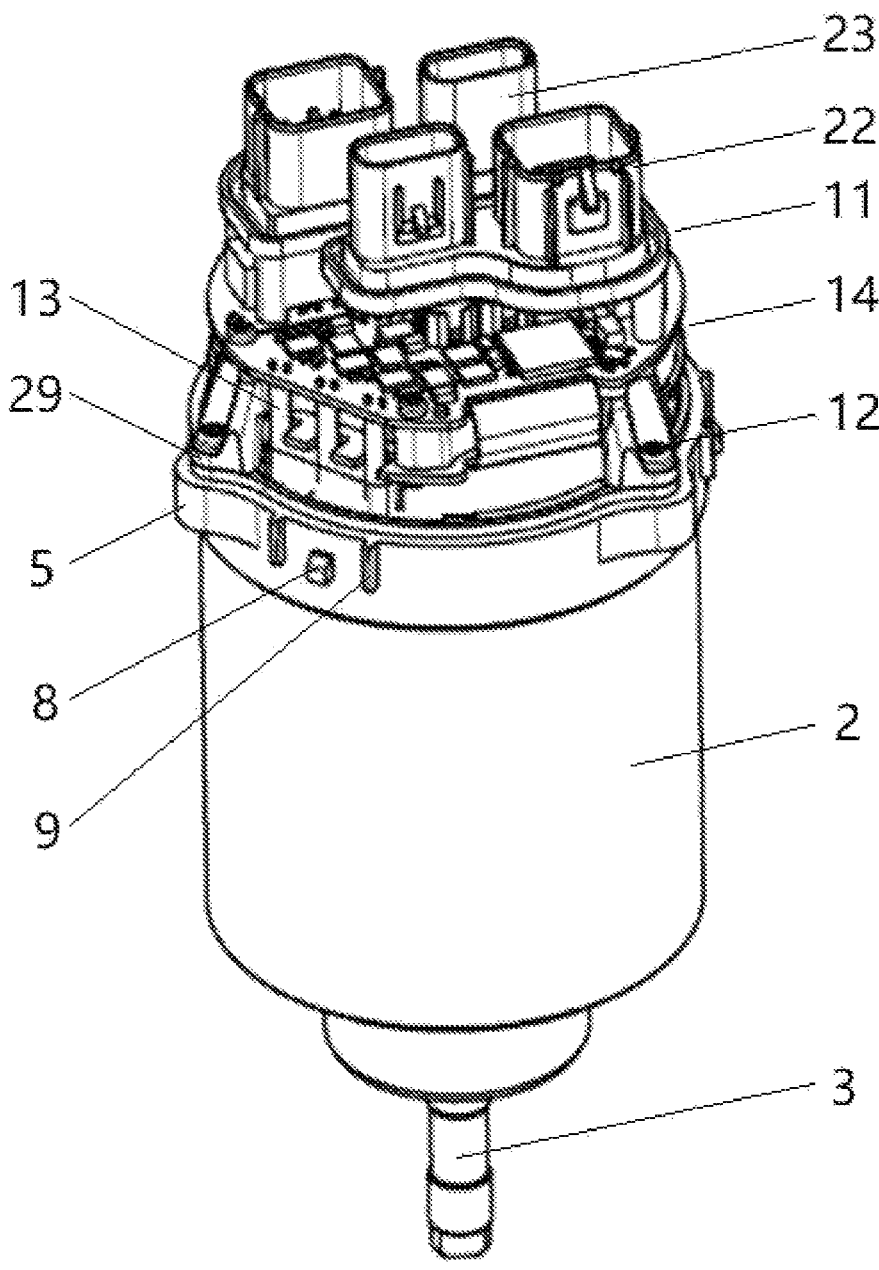
FIG. 4 is a schematic structural diagram of a redundant electric power steering apparatus according to an embodiment of the present application, in which no housing is mounted.
Figure 5:
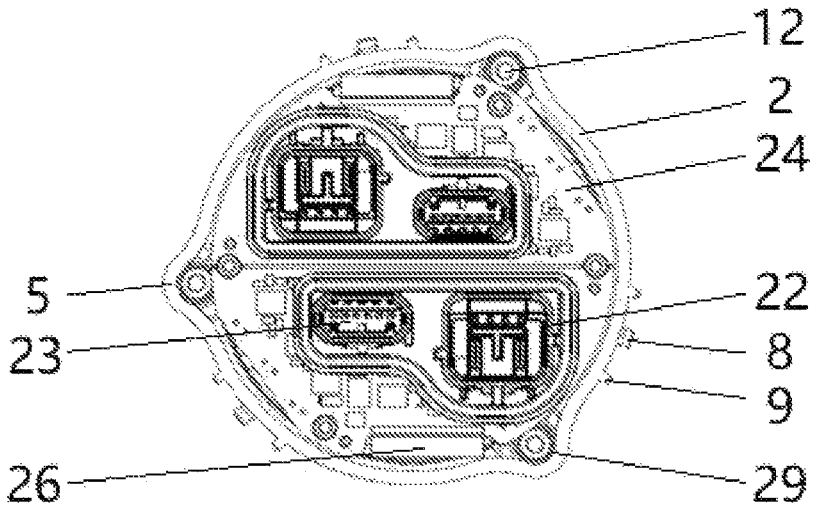
FIG. 5 is a top view of a redundant electric power steering apparatus according to an embodiment of the present application, in which no housing is mounted.

The motor 1 of the redundant electric power steering apparatus is a six-way brushless motor, which can be regarded as two three-phase motors. In the specific implementation process, the pins of the motor 1 are divided into two sets with equal pin numbers. In order to form a short-distance transmission loop, as shown in FIG. 4, the two sets of pins of the motor 1 are respectively soldered at locations of the two redundant parts away from a circle center of the second circuit board, and each set of pins of the motor 1 are equally spaced and uniformly distributed. That is, three slots 27, through which each set of the three pins of the motor 1 are respectively passed to be provided on the first circuit board 25, corresponding to the set of the three pins, are soldered to the two redundant parts, so that the power supplies are inputs independent from each other. The motor 1 obtains power supply from the control unit via the motor interface, and also feeds back motor position information, current information and the like to the control unit via the motor interface. The control unit drives the three-phase bridge circuit to output a required torque via current closed-loop control.

In an embodiment of the present application, the redundant EPS controllers of the electric-driven redundant electric power steering apparatus are two controllers. The two controllers which are provided on the first circuit board 25 are connected to each other via Ethernet or CAN FD. Through the arrangement of the connector 11 and the devices on the circuit board 14, the periphery of the redundant control apparatus is provided with two independent power supply systems, ignition systems and CAN buses, and the interior thereof is composed of two independent TAS sensors, redundant EPS controllers and six-phase brushless motors. The single EPS controller consists of a power handling module, a MCU minimum system, a torque sensor power supply module, a torque sensor conditioning circuit module, a temperature control module, a CAN communication module, a motor drive module and a motor current sampling module. At the same time, in order to improve the functional safety of the system, a turn-off MOS can be provided for each phase, and when failure occurs to a phase, output of the phase can be cut off.

In the process of application, the redundant EPS controller obtains the system power supply and ignition signals from two independent power supply systems of the whole vehicle via a whole vehicle redundant interface, obtains the information such as the engine speed, the vehicle speed and the ADAS request of the whole vehicle via two independent CAN buses, at the same time, transmits the information about the state of the EPS system and the response to the ADAS via the CAN bus, and obtains the steering wheel angle and torque signals via the TAS interface. The output signal type of the sensor is the SPC signal. Based on the whole vehicle input and TAS input, the controller provides appropriate power assistance through the drive motor. In this process, the motor obtains power supply from the controller through the motor interface, and also feeds back motor position information, current information and the like to the controller through the motor interface, and the controller drives the three-phase bridge circuit to output the required torque through current closed-loop control.

Since the EPS system of the electric power steering system adopts a redundant architecture, which can ensure that the system function is not degraded as possible under the premise of ensuring functional safety when failure occur to signals or components. When abnormality occurs to any one controller, according to the abnormal state of the system, it can be determined whether normal instructions can be transmitted through inter-circuit board communication to ensure that the system function is not degraded.

In summary, the present application discloses a redundant electric power steering apparatus, which uses bilateral folded upper and lower circuit boards to achieve redundant control, reduces the space occupied by the circuit board in the redundant electric power steering apparatus and the composed components, which is not only beneficial to improving the arrangement efficiency in packaging and reducing the size of packaging, but also reduces the number of structural assembly fittings by half, reduces the installation process, greatly reduces manpower and material resources, and improves the installation efficiency, compared with the redundant control apparatus in the background technology. At the same time, in the redundant electric power steering apparatus, the functions of fixing, connecting, heat dissipation and grounding for circuit board are designed on one base, realizing integration of multi-functions, further reducing the size of packaging and improving the space utilization. In addition, by the upper and lower circuit boards being parallel to the end face of the casing of the motor, the radial space is efficiently utilized, and the occupation of the axial space is reduced, thereby reducing the overall volume of the apparatus and advantageously overcoming the limitation of the installation space in the vehicle.

The advantageous effects of the embodiments of the present application are as follows:

Bilateral folded upper and lower circuit boards is used to achieve redundant control, thereby reducing the space occupied by the circuit board in the redundant electric power steering apparatus and the composed components, which is not only beneficial to improving the arrangement efficiency in packaging and reducing the size of packaging, but also reduces the number of structural assembly fittings by half, reduces the installation process, greatly reduces manpower and material resources, and improves the installation efficiency, compared with the redundant control apparatus in the background technology. At the same time, in the redundant electric power steering apparatus, the functions of fixing, connecting, heat dissipation and grounding for circuit board are designed on one base, realizing integration of multi-functions, further reducing the size of packaging and improving the space utilization. In addition, by the upper and lower circuit boards being parallel to the end face of the casing of the motor, the radial space is efficiently utilized, and the occupation of the axial space is reduced, thereby reducing the overall volume of the apparatus and advantageously overcoming the limitation of the installation space in the vehicle.

The technical effects of the embodiments of the present application include:

1. In the present embodiments, with a rigid circuit board being combined with a flexible circuit board, the circuit board for redundant control is designed as a structure of bilateral folded upper and lower circuit boards, so that the components for the redundant control is highly integrated, the number of inter-board connectors is reduced, the space occupied by the whole circuit board for redundancy control is reduced, the space utilization rate is improved, and as a result, the packaging size is reduced. This is one of the technical effects of the embodiments of the present application.

2. In the present embodiments, the base is not only used for connection with the motor, but also serves to fix and support the upper and lower circuit boards via the design of the bosses thereon, and also serves the function of grounding conduction. At the same time, the heat-conductive adhesive is used for attachment with the circuit board and serves the function of heat dissipation. The functions of fixing, connecting, heat dissipation and grounding are integrated into the base, which saves most structures, saves assembly parts, is simpler to install and is easy to implement. This is one of the technical effects of the embodiments of the present application.

3. In the present embodiments, the upper and lower circuit boards are parallel to the end face of the casing of the motor to efficiently use the radial space and reduce the occupation of the axial space, thereby reducing the volume of the redundant control apparatus. This is one of the technical effects of the embodiments of the present application.

4. In the present embodiments, the housing is provided with wrapping portions for accommodating mounting lugs. The mounting lugs and the mounting screws thereon are wrapped inside the housing under the premise of ensuring that the overall volume of the apparatus is as small as possible, which can not only improve the sealing performance of the whole structure, but also effectively avoid the salt fog corrosion that may be caused by screws. This is one of the technical effects of the embodiments of the present application.

5. In the present embodiments, when the adhesive between the housing and the casing for sealing is not dried, the design of clip fixes the housing to the casing of the motor of the redundant electric power steering apparatus, which is advantageous for uniformly drying the adhesive and achieving the connection between the housing and the casing and ensuring the sealing performance of the space inside the housing. This is one of the technical effects of the embodiments of the present application.

6. In the present embodiments, a waterproof air-permeable membrane is provided on the top of the housing, which has the features of waterproof, dustproof, oil stain prevention, chemical agent resistance, high and low temperature resistance, anti-aging, and the like. The membrane can enable the protection level of the redundant electric power steering apparatus to reach IP6K9K. Soldering the waterproof air-permeable membrane to the top of the housing is easy to operate and implement. At the same time, an opening for connecting the inside of the housing with the outside is designed on the side surface of the housing with the air-permeable channel, which effectively saves the space for installing air-permeable valve. This is one of the technical effects of the embodiments of the present application.

7. In the present embodiments, according to the cylindrical shape of the motor, the circuit board is designed to be circular, the second circuit board is designed to be two semi-circles, and the second circuit board and all the devices thereon are arranged to be centrosymmetric. Since the devices on the two semi-circles are the same, that is, they are identical structures that are centrosymmetric with each other. The distribution and arrangement of the structures are more uniform and space is saved. This is one of the technical effects of the embodiments of the present application.

8. In the present embodiments, in an EPS system adopting a redundant architecture, when abnormality occurs to any one controller, according to the abnormal state of the system, it can be determined whether normal instructions can be transmitted through inter-circuit board communication to ensure that the system function is not degraded. Therefore, it can be ensured that the system function is not degraded as possible under the premise of ensuring functional safety when a fail occurs to signals or components. This is one of the technical effects of the embodiments of the present application.

It should be noted that similar reference numbers and letters indicate similar items in the following drawings. Therefore, once a certain item is defined in one drawing, it does not need to be further defined and explained in the subsequent drawings.

In the description of the present application, it should be noted that, unless otherwise expressly specified and limited, the terms "installed", "connected", "connection" and "attached" should be understood in a broad sense, for example, they can refer to a fixed connection, a detachable connection or an integral connection, which can be a direct connection, an indirect connection via an intermediate medium, or an internal communication between two elements. For those of ordinary skill in the art, the specific meanings of the above-mentioned terms in the present application can be understood in accordance with specific conditions.

In the description of the present application, it should be noted that, unless otherwise specified, directional or positional relations illustrated by terms "central", "upper", "lower", "left", "right", "vertical", "horizontal", "inner", "outer" and the like are directional or positional relations based on illustration of the drawings, which are merely intended to describe the present application and simplify the description, not to show or imply that the device or the element referred to must be located in a particular direction or be configured or operated in a particular direction, thus it should not be understood as a limitation on the present application.

Finally, it should be noted that the above embodiments, which are only specific embodiments of the present application, are intended to illustrate and not to limit the scope of the present application, which is not limited in this regard. Although the present application has been described in detail with reference to the aforementioned embodiments, it will be understood by those skilled in the art that any person skilled in the art, within the scope of the technology disclosed herein, the technical solutions recited in the above embodiments may be modified or variations thereto are readily apparent to those skilled in the art, or that portions thereof may be equivalently substituted, and that such modifications, variations, or alternatives do not substantially depart from the gist and scope of the subject matter of this application, which are intended to be within the scope of this application. Therefore, the protection scope of this application should be subject to the protection scope of the claims.

What is claimed is:

1. A redundant electric power steering apparatus, wherein the redundant electric power steering apparatus comprises a first circuit board configured to control a motor and a second circuit board configured to control the motor, and the first circuit board and the second circuit board are stacked along a direction parallel to an end face of a casing of the motor,
the first circuit board is provided with a plurality of control units,
the second circuit board comprises a plurality of redundant parts, the plurality of redundant parts are positioned on a same plane, and each of the redundant parts is respectively connected to the first circuit board in a bending manner,
the second circuit board is divided into two redundant parts, and the redundant electric power steering apparatus further comprises connectors, each of the two redundant parts is connected to one set of connectors, and the two sets of connectors are centrosymmetric with respect to the axial direction of the drive shaft of the motor, and each of the two sets of connectors includes a first connector and a second connector.

2. The redundant electric power steering apparatus according to claim 1, wherein the redundant parts are equal in number to the control units, and the redundant parts are in one-to-one correspondence with the control units, so that each of the control units is respectively connected to a set of power devices to form multiple sets of processor modules.

3. The redundant electric power steering apparatus according to claim 1, wherein the number of the redundant parts is two,
the two redundant parts are centrosymmetric with respect to an axial direction of a drive shaft of the motor.

4. The redundant electric power steering apparatus according to claim 3, wherein the motor is a six-phase brushless motor,
pins of the motor are divided into two sets of pins with equal pin numbers, the two sets of pins of the motor are respectively soldered at locations of the two redundant parts away from a circle center of the second circuit board, and the pins of each of the two sets of pins of the motor are equally spaced and uniformly distributed.

5. The redundant electric power steering apparatus according to claim 3, wherein the redundant electric power steering apparatus further comprises a base and a housing,
bosses are arranged on both of upper and lower surfaces of the base, the second circuit board and the first circuit board are respectively mounted on the upper and lower surfaces of the base, and are adhered to the bosses via heat conductive adhesive,
the base, the first circuit board and the second circuit board are accommodated in the housing, the connectors are soldered to the second circuit board, and interfaces of the connectors are connected to space outside the housing.

6. The redundant electric power steering apparatus according to claim 5, wherein the bosses are correspondingly designed according to MOS tubes and an exposed copper area at pre-drive position on the second circuit board and MOS tubes and an exposed copper area at pre-drive position on the first circuit board, so that the bosses are connected to an area of the second circuit board that needs to be dissipated and an area of the first circuit board that needs to be dissipated and the bosses are adhered to the second circuit board and the first circuit board by the heat conductive adhesive for heat dissipation.

7. The redundant electric power steering apparatus to claim 5, wherein the housing is provided with an air-permeable channel,
one end of the air-permeable channel is opened on an outer side surface of the housing, the other end of the air-permeable channel is opened on an inner upper surface of the housing, and the end of the air-permeable channel opened on the inner upper surface of the housing is provided with a waterproof air-permeable membrane.

8. The redundant electric power steering apparatus according to claim 5, wherein the base is mounted to an end face of the casing of the motor on a side opposite to an output portion of the drive shaft of the motor, and the housing is snap-fitted to an end of the casing of the motor on the side opposite to the output portion of the drive shaft of the motor to form a sealed space with the casing of the motor, a plurality of mounting lugs extending downward are arranged on a side surface of the base, the mounting lugs are provided with mounting holes, mounting portions corresponding to the mounting lugs are arranged on the end face of the casing of the motor on the side opposite to the output portion of the drive shaft of the motor, and the mounting lugs are mounted to the mounting portions with screws passing through the mounting holes, the housing is provided with wrapping portions corresponding to the mounting lugs, and when the housing is snap-fitted to the casing of the motor, the wrapping portions are snap-fitted to the mounting portions so that the mounting lugs are placed in the sealed space between the housing and the casing of the motor.

9. The redundant electric power steering apparatus according to claim 8, wherein three clips are uniformly arranged on a side surface of the housing by being spaced apart from one another by 120° along a circumferential direction, the clips are spaced apart from the wrapping portions, and stops corresponding to the clips are arranged on a side surface of the casing of the motor.

10. The redundant electric power steering apparatus according to claim 9, wherein each of the clips comprises a first vertical portion, a second vertical portion and a connection portion, one end of the first vertical portion and one end of the second vertical portion are respectively fixed on the side surface of the housing, the other end of the first vertical portion and the other end of the second vertical portion are connected via the connection portion, and the clip for clamping the stop is formed by the first vertical portion, the second vertical portion and the connection portion.

11. The redundant electric power steering system according to claim 10, wherein both sides of the stop are respectively provided with a stop bar, and when the stop is clamped in the clip, the first vertical portion is clamped between the stop and one of the stop bars, and the second vertical portion is clamped between the stop and the other of the stop bars.

12. The redundant electric power steering apparatus according to claim 1, wherein each of the first circuit board and the second circuit board is circular, the second circuit board is divided into two equal semicircles to form the two redundant parts, and all devices arranged on the two redundant parts are centrosymmetric with respect to an axial direction of a drive shaft of the motor.

13. The redundant electric power steering apparatus according to claim 12, wherein the two redundant parts are respectively connected to the first circuit board through a bent flexible circuit board to implement bilateral redundancy.

14. The redundant electric power steering apparatus according to claim 1, wherein pins of the two sets of connectors are respectively soldered to the two redundant parts centrosymmetrically with respect to the drive shaft of the motor, soldering locations for the pins of each of the two sets of connectors are arranged linearly and are distributed in parallel along a boundary line separating the two redundant parts.

* * * * *